United States Patent
Yamagishi et al.

(10) Patent No.: US 8,993,661 B2
(45) Date of Patent: Mar. 31, 2015

(54) CHLOROPRENE RUBBER AND CHLOROPRENE RUBBER COMPOSITION

(75) Inventors: Uichiro Yamagishi, Itoigawa (JP); Yasushi Abe, Itoigawa (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/114,890

(22) PCT Filed: Feb. 7, 2012

(86) PCT No.: PCT/JP2012/052731
§ 371 (c)(1),
(2), (4) Date: Oct. 30, 2013

(87) PCT Pub. No.: WO2012/153552
PCT Pub. Date: Nov. 15, 2012

(65) Prior Publication Data
US 2014/0073727 A1    Mar. 13, 2014

(30) Foreign Application Priority Data
May 9, 2011    (JP) ................................ 2011-104104

(51) Int. Cl.
| | |
|---|---|
| *C08K 5/52* | (2006.01) |
| *C08K 5/42* | (2006.01) |
| *C08L 11/00* | (2006.01) |
| *C08K 5/09* | (2006.01) |
| *C08K 5/521* | (2006.01) |
| *C08K 5/524* | (2006.01) |

(52) U.S. Cl.
CPC ... *C08K 5/52* (2013.01); *C08K 5/09* (2013.01); *C08K 5/42* (2013.01); *C08K 5/521* (2013.01); *C08K 5/524* (2013.01)
USPC ........................................................ 524/145

(58) Field of Classification Search
CPC ............ C08K 5/521; C08K 5/52; C08K 5/42; C08K 5/09; C08L 11/00
USPC ........................................................ 524/145
See application file for complete search history.

(56) References Cited

FOREIGN PATENT DOCUMENTS

| | | | |
|---|---|---|---|
| JP | 62-7749 | A | 1/1987 |
| JP | 62007749 | A * | 1/1987 |
| JP | 11-116628 | A | 4/1999 |
| JP | 11116628 | A * | 4/1999 |
| JP | 2001-181450 | A | 7/2001 |
| JP | 2005-60546 | A | 3/2005 |
| JP | 2005-68405 | A | 3/2005 |
| JP | 2006-143826 | A | 6/2006 |
| JP | 2007-23102 | A | 2/2007 |
| JP | 2007023102 | A * | 2/2007 |
| JP | 2007-308550 | A | 11/2007 |
| JP | 2007308550 | A * | 11/2007 |
| JP | 2009-191182 | A | 8/2009 |
| JP | 2010-275338 | A | 12/2010 |

OTHER PUBLICATIONS

International Search Report mailed Apr. 24, 2012, issued in corresponding International Application No. PCT/JP2012/052731.

\* cited by examiner

*Primary Examiner* — Michael M Bernshteyn
(74) *Attorney, Agent, or Firm* — Stein IP, LLC

(57) ABSTRACT

Provided is a chloroprene rubber superior in the effectiveness of preventing mold staining.

The chloroprene rubber contains at least one compound selected from phosphite ester compounds (such as tris(nonylphenyl)phosphite ester and tributyl phosphite ester) and phosphate ester compounds (such as tri(nonylphenyl)phosphate ester and tributyl phosphate ester) in a total amount of 0.1 to 5.0 mass % and additionally at least one compound selected from sulfonic acid compounds (such as benzenesulfonic acid and dodecylbenzenesulfonic acid) and fatty acid compounds in a total amount of 0.1 to 3.0 mass %.

13 Claims, No Drawings

CHLOROPRENE RUBBER AND CHLOROPRENE RUBBER COMPOSITION

CROSS-REFERENCE TO RELATED APPLICATIONS

This application is a national stage of International Application No. PCT/JP2012/052731, filed Feb. 7, 2012, which claims the benefit of Japanese Application No. 2011-104104, filed May 9, 2011, in the Japanese Patent Office. All disclosures of the document(s) named above are incorporated herein by reference.

BACKGROUND OF THE INVENTION

1. Field of the Invention

The present invention relates to a chloroprene rubber and a chloroprene rubber composition. More specifically, it relates to a chloroprene rubber and a chloroprene rubber composition to be molded in mold.

2. Description of the Related Art

Chloroprene rubbers, which are superior in heat resistance, weather resistance, ozone resistance, and chemical resistance, have been used in various fields such as of general industrial rubber products, automobile parts, and adhesive agents. Such chloroprene rubber molded articles are produced generally by molding a chloroprene rubber composition containing chloroprene rubber and additionally vulcanizing agents, vulcanization accelerators, fillers, and others into a particular shape and vulcanizing the molded article (see, for example, Patent Document 1).

On the other hand, chloroprene rubbers have a problem that, when chloroprene rubber molded articles are produced by a method of using a mold, such as injection molding, extrusion molding, or press molding, the resin blend easily remains deposited or layered on the internal surface of the mold. Such mold staining leads to deterioration in dimensional accuracy and appearance and thus in quality of the molded article.

Chloroprene compositions containing a component that is effective in preventing the mold staining were proposed (see, for example, Patent Documents 2 and 3). Specifically, Patent Document 2 discloses a chloroprene rubber composition comprising 100 parts by mass of a chloroprene rubber and 1 to 10 parts by mass of a polyethylene glycol having an average molecular weight of 8000 to 11000. Alternatively, Patent Document 3 discloses a chloroprene rubber composition comprising 100 parts by mass of a chloroprene rubber and 1 to 50 parts by mass of a chlorinated polyethylene.

On the other hand, instead of the methods of modifying the composition, a method for making the chloroprene rubber itself less staining was also proposed (see Patent Document 4). In the chloroprene rubber described in Patent Document 4, a metal salt of a disproportionate[ ] rosin acid having a sesquiterpene content of 0 to 1 mass % and a content ratio of (8,15-isopimaric acid)/(dihydropimaric acid) of 1 or more is used as the emulsifier, for prevention of the mold staining caused by the emulsifier component remaining in the chloroprene rubber.

CITATION LIST

Patent Literatures

[Patent Document 1] Japanese Unexamined Patent Application Publication No. 2005-68405
[Patent Document 2] Japanese Unexamined Patent Application Publication No. 2001-181450
[Patent Document 3] Japanese Unexamined Patent Application Publication No. 2005-60546
[Patent Document 4] Japanese Unexamined Patent Application Publication No. 2006-143826

SUMMARY OF THE INVENTION

Technical Problem

However, the methods for preventing mold staining by conventional chloroprene rubbers described above have the following problems: Specifically, the methods of blending a mold staining-suppressing component such as polyethylene glycol or chlorinated polyethylene, as used for the chloroprene rubber compositions described in Patent Documents 2 and 3, demand physical kneading, for example with an open roll or an internal stirrer, and often cause a problem that the chemicals are dispersed unevenly.

Alternatively as described in Patent Document 4, in the case of the method of reducing the amount of the contaminants contained in chloroprene by using a particular emulsifier, deposits, if formed on a mold, become solidly fixed to the mold surface by oxidative degradation and thus, it is not possible to prevent mold staining. For the reasons above, conventional chloroprene rubber compositions were less effective in preventing mold staining and thus, further improvement is desired.

Accordingly, the major object of the present invention is to provide a chloroprene rubber and a chloroprene rubber composition effectively resistant to such mold staining.

Solution to Problem

The chloroprene rubber according to the present invention comprises at least one compound selected from phosphite ester compounds and phosphate ester compounds in a total amount of 0.1 to 5.0 mass % and at least one compound selected from sulfonic acid compounds and fatty acid compounds in a total amount of 0.1 to 3.0 mass %.

The fatty acid compound blended in the chloroprene rubber may be, for example, a fatty acid compound having a functional group equivalence of $2 \times 10^{-3}$ to $8 \times 10^{-3}$.

Alternatively, the sulfonic acid compound used may be a sulfonic acid compound having a structure represented by the following Chemical Formula 1 and typical examples thereof include benzenesulfonic acid, dodecylbenzenesulfonic acid, and the like. In the following Chemical Formula 1, R represents an alkyl or aryl group.

R—SO$_3$H           [C. 1]

Alternatively, the phosphite ester compound blended may be a phosphite ester having a structure represented by the following Chemical Formula 2 and typical examples thereof include tris(nonylphenyl)phosphite ester, tributyl phosphite ester, and the like.

Yet alternatively, the phosphate ester compound blended may be a phosphate ester having a structure represented by the following Chemical Formula 3 and typical examples thereof include tri(nonylphenyl)phosphate ester, tributyl phosphate ester, and the like.

In the following Chemical Formulae 2 and 3, R, $R^1$, $R^2$, and $R^3$ each represent an alkyl or aryl group and the groups may be the same as or different from each other.

[C. 2]

[C. 3]

In addition, the chloroprene rubber may be a chloroprene rubber produced as its latex is adjusted to a pH of 7.5 or more, before the steps of converting it into sheet with a freeze roll and the resulting sheet being washed with water.

The chloroprene rubber composition according to the present invention, which comprises the chloroprene rubber described above, gives deposits having an average thickness of 3 μm or less or does not give deposits having a thickness of 10 μm or more, when 11.0±0.2 g of the composition is premolded into a cylindrical shape, the molding is placed in a cylindrical mold having a diameter of 29 mm and a height of 12.5 mm, the mold is held between compression plates, a ferrotype plate is connected to the lower regions of the compression plates, and the molding is vulcanized 200 times at 200° C. for 5 minutes.

Advantageous Effects of Invention

The chloroprene rubber composition according to the present invention, which contains phosphite and/or phosphate ester compounds and sulfonic and/or fatty acid compounds respectively in particular amounts, can significantly suppress mold staining during molding.

Additional aspects and/or advantages of the invention will be set forth in part in the description which follows and, in part, will be obvious from the description, or may be learned by practice of the invention.

DETAILED DESCRIPTION OF THE EMBODIMENTS

Hereinafter, favorable embodiments of the inventions will be described in detail, but it should be understood that the present invention is not restricted by the embodiments below.

First Embodiment

First, the chloroprene rubber in a first embodiment of the present invention will be described. The chloroprene rubber of the present embodiment comprises a chloroprene polymer as its main component and additionally a phosphite ester compound and/or a phosphate ester compound in a total amount of 0.1 to 5.0 mass % and a sulfonic acid compound and/or a fatty acid compound in a total amount of 0.1 to 3.0 mass %.

[Chloroprene Polymer]

The chloroprene polymers include homopolymers of 2-chloro-1,3-butadiene (hereinafter, referred to as chloroprene) and copolymers of chloroprene with other monomers. The monomers copolymerizable with chloroprene include, for example, acrylate esters such as methyl acrylate, butyl acrylate, and 2-ethylhexyl acrylate; methacrylate esters such as methyl methacrylate, butyl methacrylate, and 2-ethylhexyl methacrylate; hydroxy(meth)acrylates such as 2-hydroxyethyl(meth)acrylate, 2-hydroxymethyl(meth)acrylate, and 2-hydroxypropyl(meth)acrylate; 2,3-dichloro-1,3-butadiene, 1-chloro-1,3-butadiene, butadiene, isoprene, ethylene, styrene, acrylonitrile, and the like.

The monomer copolymerizable with chloroprene is not limited to a single compound and, for example, three kinds or more monomers including chloroprene may be copolymerized. The polymer structure of the chloroprene polymer is also not particularly limited.

[Phosphite and Phosphate Ester Compounds: 0.1 to 5.0 Mass % in Total]

The phosphite and phosphate ester compounds are effective in preventing oxidation of the blend deposited on the mold surface. However, when the total content thereof is less than 0.1 mass %, they are not sufficiently effective, while when the total content thereof is more than 5.0 mass %, the physical properties of the chloroprene rubber composition may decline. Thus, the total content of the phosphite and phosphate ester compounds is 0.1 to 5.0 mass %.

The phosphite ester compound has a structure represented by the following Chemical Formula 4. In the following Chemical Formula 4, R, $R^1$, $R^2$, and $R^3$ each represent an alkyl or aryl group and they may be the same as or different from each other. Examples of the phosphite ester compounds contained in the chloroprene rubber of the present embodiment include tris(nonylphenyl)phosphite ester, tributyl phosphite ester, and the like.

[C. 4]

The phosphate ester compound has a structure represented by the following Chemical Formula 5. In the following Chemical Formula 5, R, $R^1$, $R^2$, and $R^3$ each represent an alkyl or aryl group and they may be the same as or different from each other. Examples of the phosphate ester compounds contained in the chloroprene rubber of the present embodiment include tri(nonylphenyl)phosphate ester, tributyl phosphate ester, and the like.

[C. 5]

[Sulfonic and Fatty Acid Compounds: 0.1 to 3.0 Mass % in Total]

The sulfonic and fatty acid compounds are effective in inhibiting deposition of the blend on the mold surface. However when the total content thereof is less than 0.1 mass %, they are not sufficiently effective, while when the total content thereof is more than 3.0 mass %, the physical properties of the chloroprene rubber composition may decline and there may be incomplete fusion during molding. Accordingly, the total content of the sulfonic and fatty acid compounds is 0.1 to 3.0 mass %.

The sulfonic acid compound has a structure represented by the following Chemical Formula 6. In the following Chemical Formula 6, R represents an alkyl or aryl group. Examples of the sulfonic acid compounds having a structure represented by the following Chemical Formula 6 include benzenesulfonic acid, dodecylbenzenesulfonic acid, methanesulfonic acid, CAS (10-camphorsulfonic acid), p-toluenesulfonic acid (tosic acid), and the like, and benzenesulfonic acid and dodecylbenzenesulfonic acid are particularly favorable among them.

[C. 6]

For improvement of the efficiency of preventing mold staining, fatty acid compounds having a functional group equivalence, as specified by the following Numerical Formula 1, of $2\times10^{-3}$ to $8\times10^{-3}$ are preferable. Examples of the fatty acid compounds include stearic acid, oleic acid and the like.

$$\text{(Functional group equivalence)} = \frac{\text{(Number of carboxyl groups)}}{\text{(Molecular weight of fatty acid)}} \quad \text{[Numerical formula 1]}$$

[Other Components]

The chloroprene rubber of the present embodiment may comprise, in addition to the components described above, other components such as rosin acids, rosin acid salts, emulsifiers and dispersants, polymerization reaction catalysts, catalyst-activating agents, chain-transfer agents, and polymerization inhibitors.

[Production Method]

Hereinafter, the method for producing the chloroprene rubber in the present embodiment will be described. In the method for producing the chloroprene rubber of the present embodiment, raw monomers containing chloroprene as the main component are emulsion-polymerized.

The emulsifying dispersant used then may by a rosin acid or a rosin acid salt. Typical examples of the rosin acids include resin acids such as abietic acid, dehydroabietic acid, dihydroabietic acid, pimaric acid, dihydropimaric acid, isopimaric acid, secodehydroabietic acid, and the mixtures thereof, and the like.

These rosin acids may contain a fatty acid such as oleic acid, stearic acid, or octadecenoic acid. Alternatively, slightly colored rosin acids, which are prepared by subjecting a rosin acid to hydrogenation reaction and/or disproportionation reaction and purifying the reaction products, can also be used. Yet alternatively, examples of the rosin acid salts include alkali-metal salts such as sodium and potassium salts, alkali-earth metal salts such as calcium salts, ammonium salts, and the like. The emulsifying dispersant is not particularly limited to rosin acids or rosin acid salts and compounds commonly used in emulsion polymerization of common chloroprenes, such as aromatic naphthalene formalin condensates, may also be used.

Examples of the polymerization reaction catalysts include inorganic peroxides such as potassium persulfate and organic peroxides such as ketone peroxides, peroxy ketals, hydroperoxides, dialkyl peroxides, and diacyl peroxides. Examples of the catalyst-activating agents include sodium sulfite, potassium sulfite, iron (II) oxide, anthraquinone, sodium β-sulfonate, formamidine sulfonic acid, L-ascorbic acid, and the like.

The polymerization initiator is not particularly limited and those commonly used in emulsion polymerization of common chloroprene can be used. Specifically, persulfate salts such as potassium persulfate, organic peroxides such as tert-butyl hydroperoxide, and the like are favorably used.

The chain-transfer agent is also not particularly limited and those commonly used in emulsion polymerization of common chloroprene can be used. Typical examples thereof are known chain-transfer agents including long-chain alkyl mercaptans such as n-dodecyl mercaptan, tert-dodecylmercaptan, and n-octyl mercaptan; dialkyl xanthogen disulfides such as diisopropyl xanthogen disulfide and diethyl xanthogen disulfide; iodoform and the like.

The terminator added for termination of polymerization is not particularly limited and those commonly used may be used. Typical examples thereof include phenothiazine, para-t-butylcatechol, hydroquinone, hydroquinone monomethyl-ether, diethylhydroxylamine, thiodiphenylamine, 1,3,5-trihydroxybenzene, and the like.

The polymerization temperature for the chloroprene latex is not particularly limited and may be in the range in which emulsion polymerization generally performed. The final polymerization rate of the chloroprene polymer (chloroprene rubber) obtained in the polymerization step described above is also not particularly limited and may be adjusted arbitrarily in the range of 0 to 100%.

In the method for producing the chloroprene rubber in the present embodiment, a certain amount of the sulfonic and fatty acid compounds is added for example when the raw monomers are emulsified in water, or a chloroprene monomer emulsion containing these compounds dissolved therein is added to the polymer solution after polymerization. The kinds of the sulfonic and fatty acid compounds used then are not particularly limited, but metal salts of the sulfonic and fatty acids are added preferably and the sodium or potassium salts thereof are added more preferably.

On the other hand, the phosphite and phosphate ester compounds are added in a certain amount, for example to the polymer solution after polymerization, as a chloroprene monomer emulsion containing these compound therein. It is thus possible to adjust easily the total content of the phosphite and phosphate ester compounds in chloroprene to 0.1 to 5.0 mass % and the total content of the sulfonic and fatty acid compounds to 0.1 to 3.0 mass %.

Subsequently, unreacted monomers in the polymer solution obtained in the polymerization step are removed (monomer removal). The method is not particularly limited and the monomer removal can be carried out by a known method such as heating under reduced pressure. Even if the sulfonic acid compound, the fatty acid compound, the phosphite ester compound, and the phosphate ester compound are added as a chloroprene monomer emulsion after polymerization, the residual unreacted monomers do not cause any problem, as they are removed in the subsequent monomer removal step.

The chloroprene-based polymer (chloroprene latex) is adjusted to a pH of 7.5 or more, for example with dilute acetic acid, and molded into a sheet shape with a freeze roll. The sheet is washed with water, dehydrated, and dried, to give a chloroprene rubber sheet. It is possible in this way to make the emulsifier, one of the causative components for mold staining, dissolved in water and remove it effectively, by adjusting the pH of the latex to 7.5 or more before washing or other processing by the freeze-solidification-drying method.

Although the detailed mechanism remains unknown, as the chloroprene rubber of the present embodiment contains the phosphite and/or phosphate ester compounds and the sulfonic and/or fatty acid compounds in particular amounts, it is possible with the phosphite and phosphate ester compounds to prevent fixation of the deposits on the mold surface by oxidation and also deposition of the blend on the mold surface by interaction of the acidic functional groups of the sulfonic and fatty acids with the metal atoms on the mold surface. It is thus possible to prevent contamination of the mold.

Second Embodiment

Hereinafter, the chloroprene rubber composition in a second embodiment of the present invention will be described. The chloroprene rubber composition of the present embodiment contains, in addition to the chloroprene rubber described above in the first embodiment, additives such as a vulcanizing agent, a vulcanization accelerator, a filler, a reinforcing agent, a softening agent, a plasticizer, a lubricant, an aging inhibitor, a stabilizer, a silane-coupling agent, and an acid acceptor.

The vulcanizing agents that may be added to the chloroprene rubber composition of the present embodiment include, for example, metals such as beryllium, magnesium, zinc, calcium, barium, germanium, titanium, tin, zirconium, antimony, vanadium, bismuth, molybdenum, tungsten, tellurium, selenium, iron, nickel, cobalt, and osmium, the oxides and hydroxides thereof and the like. In particular among the metal compounds above, calcium oxide, zinc oxide, antimony dioxide, antimony trioxide, and magnesium oxide are preferable, as they are highly effective for vulcanization. These vulcanizing agents may be used in combination of two or more.

The vulcanization accelerators include, for example, thiourea-based vulcanization accelerators, thiuram-based vulcanization accelerators, sulfenamide-based vulcanization accelerators and the like. In particular among them, ethylene thiourea is preferable, as it is superior in the balance of the processability of the composition and the physical properties of the vulcanizate. These vulcanization accelerators may be used in combination of two or more.

The chloroprene rubber composition of the present embodiment may contain, as needed, a softening agent, a filler, a reinforcing agent, a plasticizer, a processing aid, a lubricant, an aging inhibitor, a stabilizer, a silane-coupling agent, and the like, as they are blended.

The fillers and the reinforcing agents blended to the chloroprene rubber composition of the present embodiment may be any materials that are used in common chloroprene rubber application and examples thereof include carbon black, silica, clay, talc, calcium carbonate, and the like.

Alternatively, the plasticizers for use may also be those used in common chloroprene rubber application and examples thereof include dioctyl phthalate, dioctyl adipate, and the like.

The aging inhibitors for use may be those used in common chloroprene rubber application. Typical examples thereof include amine-based aging inhibitors, imidazole-based aging inhibitors, metal carbamate salts, phenol-based aging inhibitors, waxes, and the like, and these inhibitors may be used alone or in combination of two or more. In particular among the aging inhibitors above, use of an amine-based aging inhibitor, such as 4,4'-bis(α,α-dimethylbenzyl)diphenylamine or an octylated diphenylamine, is effective for improving the heat resistance of the molded article.

The softening agent may be a softening agent used in common chloroprene rubber application. Typical examples thereof include lubricating oils, process oils, paraffins, liquid paraffins, vaselines, petroleum softening agents such as petroleum asphalts, and vegetable oil-based softening agents such as rapeseed oils, flaxseed oils, castor oils, and palm oils, and these softening agents can be used alone or in combination of two or more.

The chloroprene rubber composition of the present embodiment preferably gives deposits having an average thickness of 3 μm or less or does not give deposits having a thickness of 10 μm or more, when it is pre-molded into a cylindrical shape of 11.0±0.2 g, the molding is placed in a cylindrical mold having a diameter of 29 mm and a height of 12.5 mm and held between compression plates and vulcanized 200 times at 200° C. for 5 minutes, as a ferrotype plate is connected to the lower regions of the compression plates. Such a chloroprene rubber composition is resistant to deposition or fixation of the blend on the mold and thus superior in mold staining-preventing efficiency.

The chloroprene rubber composition of the present embodiment can be vulcanized into a vulcanizate by a known method such as press vulcanization, injection molding vulcanization, steam pan vulcanization, UHF vulcanization, LCM vulcanization, or HFB vulcanization.

The chloroprene rubber composition of the present embodiment, which contains a chloroprene rubber comprising a phosphite ester compound and/or a phosphate ester compound and a sulfonic acid compound and/or a fatty acid compound in particular amounts, does not contaminate the mold during molding and provides vulcanizates and molded articles superior in mechanical strength and compression set.

EXAMPLES

Hereinafter, the advantageous effects of the present invention will be described more specifically with reference to the Examples and Comparative Examples of the present invention. In the present Examples, the chloroprene rubber compositions in the compositions shown in the following Table 2 were prepared from the chloroprene rubbers of Examples 1 to 5 and Comparative Examples 1 to 5 shown in the following Table 1 and the properties thereof were examined. The contents (mass %) of the components shown in the following Table 1 are values based on the total weight of the chloroprene rubber.

TABLE 1

| | Content (mass %) | | | |
|---|---|---|---|---|
| | Dodecyl-benzenesulfonic acid | Oleic acid | Tributyl phosphate ester | Tris(nonylphenyl) phosphite ester |
| Example 1 | 0.5 | 0 | 0.5 | 0 |
| Example 2 | 0.5 | 0 | 0 | 0.5 |
| Example 3 | 0 | 0.5 | 0.5 | 0 |
| Example 4 | 0 | 0.5 | 0 | 0.5 |
| Example 5 | 0.25 | 0.25 | 0.25 | 0.25 |
| Comparative Example 1 | 0.25 | 0.25 | 0.025 | 0.025 |
| Comparative Example 2 | 0.025 | 0.025 | 0.25 | 0.25 |
| Comparative Example 3 | 0.25 | 0.25 | 2.5 | 2.5 |
| Comparative Example 4 | 0 | 5 | 0.25 | 0.25 |
| Comparative Example 5 | 0 | 0 | 0 | 0 |

TABLE 2

| | Component | Blending amount (part by mass) |
|---|---|---|
| Rubber component | Chloroprene rubber | 100 |
| Aging inhibitor | Octylated diphenylamine | 2 |
| Antiozonant | N-Phenyl-N'-(1,3-dimethylbutyl)-p-phenylenediamine | 2 |
| Acid acceptor | MgO (#150) | 4 |
| Reinforcing material | Carbon black (soft roll fuser (SRF)) | 60 |
| Plasticizer | Rapeseed oil | 20 |
| Plasticizer | Di-2-ethylhexyl adipate | 10 |
| Vulcanizing agent | ZnO (two kinds) | 5 |
| Vulcanization accelerator | Ethylene thiourea | 0.8 |
| Vulcanization accelerator | Tetramethylthiuram disulfide | 1 |

Method for Producing Chloroprene Rubber

Example 1

120 parts by mass of water, 4.0 parts by mass of a disproportionated tall rosin potassium salt, 0.54 part by mass of sodium dodecylbenzenesulfonate (equivalent to 0.5 part by mass of dodecylbenzenesulfonic acid), and other additives (0.8 part by mass of sodium hydroxide and 0.3 part by mass of sodium bisulfite) were placed in a reactor having a capacity of 5 liters under nitrogen stream. After solubilization, 100 parts by mass of chloroprene monomer and 0.10 part by mass of n-dodecylmercaptan were added thereto, while the mixture was agitated.

The mixture was then polymerized in the presence of 0.1 part by mass of potassium persulfate (added as catalyst) under a nitrogen environment at 40° C. The polymerization was terminated when the final polymerization rate reached 70%, as an emulsion containing 0.5 part by mass of phenothiazine and tributyl phosphate ester was added thereto, and unreacted monomers were removed under reduced pressure. Subsequently, the chloroprene-based polymer (chloroprene latex) was adjusted to a pH of 7.5 by using dilute acetic acid. There were observed no abnormality such as coagulation. A chloroprene rubber sheet (Example 1) was obtained by the freeze-solidification-drying method.

Example 2

The chloroprene rubber of Example 2 was prepared by a method similar to that of Example 1, except that the tributyl phosphate ester was replaced with tris(nonylphenyl)phosphite ester.

Example 3

The chloroprene rubber of Example 3 was prepared by a method similar to that of Example 1, except that sodium dodecylbenzenesulfonate was replaced with potassium oleate.

Example 4

The chloroprene rubber of Example 4 was prepared by a method similar to that of Example 3, except that the tributyl phosphate ester was replaced with tris(nonylphenyl)phosphite ester.

Example 5

The chloroprene rubber of Example 5 was prepared by a method similar to that of Example 1, except that sodium dodecylbenzenesulfonate and potassium oleate were added in amounts respectively equivalent to 0.25 part by mass of dodecylbenzenesulfonic acid and 0.25 part by mass of oleic acid and the tributyl phosphate ester and the tris(nonylphenyl) phosphite ester were added respectively in an amount of 0.25 part by mass.

Comparative Example 1

The chloroprene rubber of Comparative Example 1 was prepared by a method similar to that of Example 5, except that the amounts of tributyl phosphate ester and tris(nonylphenyl) phosphite ester added were changed.

Comparative Example 2

The chloroprene rubber of Comparative Example 2 was prepared by a method similar to that of Example 5, except that the amounts of sodium dodecylbenzenesulfonate(dodecylbenzenesulfonic acid) and potassium oleate (oleic acid) added were changed.

Comparative Example 3

The chloroprene rubber of Comparative Example 3 was prepared by a method similar to that of Example 5, except that the amounts of tributyl phosphate ester and tris(nonylphenyl) phosphite ester added were changed.

Comparative Example 4

The chloroprene rubber of Comparative Example 4 was prepared by a method similar to that of Example 5, except that sodium dodecylbenzenesulfonate (dodecylbenzenesulfonic acid) was not added and potassium oleate was added in an amount equivalent to 5 parts by mass of oleic acid.

Comparative Example 5

The chloroprene rubber of Comparative Example 5 was prepared by a method similar to that of Example 1, except that all of sodium dodecylbenzenesulfonate(dodecylbenzenesulfonic acid), potassium oleate (oleic acid), tributyl phosphate ester, and tris(nonylphenyl)phosphite ester were not added.

The chloroprene rubber compositions in the compositions shown in Table 2 were then prepared by using the chloroprene rubbers of these Examples and Comparative Examples and evaluated by the methods under the conditions described below.

(Hardness)

A test piece was prepared according to JIS K6250 (vulcanization condition: 170° C. for 15 minutes) and the hardness of each vulcanizate (vulcanized rubber) was determined according to JIS K6253.

(Processing Properties)

The scorch time of each of the chloroprene rubber compositions of Examples and Comparative Examples were determined according to JIS K6300 at 125° C.

(Tensile Strength)

A test piece was prepared according to JIS K6250 (vulcanization condition: 170° C. for 15 minutes) and the strength and the elongation of each vulcanizate (vulcanized rubber) was determined according to JIS K6253.

(Compression Set)

Each of the chloroprene rubber compositions of Examples and Comparative Examples was vulcanized at 170° C. for 20 minutes. The compression set of the vulcanizate, as it is left under a temperature condition of 100° C. for 70 hours, was determined according to JIS K6262.

(Mold Staining)

Each of the chloroprene rubber compositions of Examples and Comparative Examples was pre-molded into a cylindrical shape of 11.0±0.2 g, which was then placed in a cylindrical mold having a diameter of 29 mm and a height of 12.5 mm and held between compression plates. A ferrotype plate was connected to the lower regions of the compression plates and the sample was vulcanized 200 times at 200° C. for 5 minutes and the deposit layer of the contaminant was observed. The vulcanizate was removed from the mold during a period of about 1 minute after each vulcanization operation and a new chloroprene rubber composition was placed again. The deposition of the contaminant was determined by using a 3D laser electron microscope (VK-9700; produced by Keyence Corporation)

The results above are summarized in the following Table 3.

TABLE 3

| | Evaluation | | | | | | |
|---|---|---|---|---|---|---|---|
| | Hardness (Shore A) | Scorch time (minute) | Tensile strength (MPa) | Elongation (%) | Compression set (%) | Average thickness of deposits (μm) | Percentage of deposits having a thickness of 10 μm or more (%) |
| Example 1 | 57 | 20.2 | 15.9 | 432 | 22 | 0.7 | 0 |
| Example 2 | 56 | 20.4 | 16 | 446 | 23 | 0.6 | 0 |
| Example 3 | 57 | 19.3 | 17.4 | 404 | 21 | 0.9 | 0 |
| Example 4 | 57 | 19.2 | 17.2 | 399 | 21 | 0.9 | 0 |
| Example 5 | 58 | 19.5 | 16.3 | 421 | 22 | 1.1 | 0 |
| Comparative Example 1 | 56 | 18.6 | 16.8 | 406 | 20 | 2.2 | 5 |
| Comparative Example 2 | 59 | 17.4 | 17.2 | 440 | 19 | 4.4 | 7 |
| Comparative Example 3 | 57 | 21.3 | 15.4 | 461 | 39 | 2.9 | 4 |
| Comparative Example 4 | 54 | 23.6 | 12.4 | 505 | 42 | 0.6 | 0 |
| Comparative Example 5 | 60 | 17 | 17.6 | 432 | 19 | 13.5 | 63 |

As shown in Table 3 above, the composition containing the chloroprene rubber of Comparative Example 1 having a phosphorous and phosphoric acid compound content of less than 0.1 mass % gave some deposits having a thickness of 10 μm or more. Alternatively, the composition containing chloroprene rubber of Comparative Example 2 having a sulfonic and fatty acid compound content of less than 0.1 mass % gave large deposits having an average thickness of 4.4 μm and some deposits having a thickness of 10 μm or more.

The composition containing the chloroprene rubber of Comparative Example 3 having a phosphorous and phosphoric acid compound content of 5.0 mass % or more had a high compression set value and gave some deposits having a thickness of 10 μm or more. Alternatively, the composition containing the chloroprene rubber of Comparative Example 4 having a fatty acid compound content of more than 3.0 mass % did not give deposits having a thickness of 10 μm or more, but had a high compression set value.

In addition, the composition containing the chloroprene rubber of Comparative Example 5 containing none of the phosphorous acid compound, phosphoric acid compound, sulfonic acid compound, or fatty acid compound gave deposits having an extremely large average thickness of 13.5 μm and a large percentage (as much as 63%) of the deposits were those having a thickness of 10 μm or more.

In contrast, the compositions containing each of the chloroprene rubbers of Examples 1 to 5, which contains dodecylbenzenesulfonic acid and/or oleic acid, and also tributyl phosphate ester and/or tris(nonylphenyl)phosphite ester in the ranges of the present invention, gave a smaller amount of deposits and were superior in other physical properties.

The results above demonstrate that it is possible according to the present invention to prevent mold staining during molding.

Although a few embodiments of the present invention have been shown and described, it would be appreciated by those skilled in the art that changes may be made in this embodiment without departing from the principles and spirit of the invention, the scope of which is defined in the claims and their equivalents.

The invention claimed is:

1. A chloroprene rubber, comprising a chloroprene homopolymer or a copolymer of chloroprene with other monomers as the main component, at least one compound from phosphite ester compounds and phosphate ester compounds in a total amount of 0.1 to less than 5.0 mass % and sulfonic acid compounds in a total amount of 0.1 to 3.0 mass %, wherein the sulfonic acid compounds are benzenesulfonic acid and/or dodecylbenzenesulfonic acid.

2. The chloroprene rubber according to claim 1, comprising a phosphite ester compound represented by the Chemical Formula below:

$$P(OR^1)(OR^2)(OR^3),$$

wherein, $R^1$, $R^2$, and $R^3$ each represent an alkyl or aryl group and these groups are the same as or different from each other.

3. The chloroprene rubber according to claim 2, wherein the phosphite ester compound is tris(nonylphenyl) phosphite ester and/or tributyl phosphite ester.

4. The chloroprene rubber according to claim 1, comprising a phosphate ester compound represented by the Chemical Formula below:

$$P(=O)(OR^1)(OR^2)(OR^3),$$

wherein, $R^1$, $R^2$, and $R^3$ each represent an alkyl or aryl group and these groups are the same as or different from each other.

5. The chloroprene rubber according to claim 4, wherein the phosphate ester compound is tri(nonylphenyl) phosphate ester and/or tributyl phosphate ester.

6. The chloroprene rubber according to claim 1, which produced as its latex is adjusted to a pH of 7.5 or more, before the steps of converting it into sheet with a freeze roll and the resulting sheet being washed with water.

7. A chloroprene rubber composition, comprising the chloroprene rubber according to claim 1 and giving deposits having an average thickness of 3 μm or less or not giving deposits having a thickness of 10 μm or more, when 11.0±0.2 g of the composition is pre-molded into a cylindrical shape, the molding is placed in a cylindrical mold having a diameter of 29 mm and a height of 12.5 mm, the mold is held between compression plates, a ferrotype plate is connected to the lower regions of the compression plates, and the molding is vulcanized 200 times at 200° C. for 5 minutes.

8. The chloroprene rubber according to claim 1, further comprising a fatty acid compound and containing the fatty acid compound and the sulfonic acid compounds in a total amount of 0.1 to 3.0 mass %.

9. The chloroprene rubber according to claim 8, wherein the fatty acid compound has a functional group equivalence of $2\times10^{-3}$ to $8\times10^{-3}$.

10. The chloroprene rubber according to claim 1, comprising a phosphite ester compound represented by the Chemical Formula below:

P(OR$^1$)(OR$^2$)(OR$^3$), wherein, R$^1$, R$^2$, and R$^3$ each represent an alkyl or aryl group and these groups are the same as or different from each other.

11. The chloroprene rubber according to claim 3, comprising a phosphate ester compound represented by the Chemical Formula below:

P(=O)(OR$^1$)(OR$^2$)(OR$^3$), wherein, R$^1$, R$^2$, and R$^3$ each represent an alkyl or aryl group and these groups are the same as or different from each other.

12. The chloroprene rubber according to claim 5, which produced as its latex is adjusted to a pH of 7.5 or more, before the steps of converting it into sheet with a freeze roll and the resulting sheet being washed with water.

13. A chloroprene rubber composition, comprising the chloroprene rubber according to claim 6 and giving deposits having an average thickness of 3 μm or less or not giving deposits having a thickness of 10 μm or more, when 11.0±0.2 g of the composition is pre-molded into a cylindrical shape, the molding is placed in a cylindrical mold having a diameter of 29 mm and a height of 12.5 mm, the mold is held between compression plates, a ferrotype plate is connected to the lower regions of the compression plates, and the molding is vulcanized 200 times at 200° C. for 5 minutes.

* * * * *